United States Patent
Frenger et al.

(10) Patent No.: US 10,660,045 B2
(45) Date of Patent: May 19, 2020

(54) DISCRIMINATING BETWEEN COMMUNICATION APPARATUSES BASED ON THEIR TRANSMITTED POWER

(71) Applicant: Telefonaktiebolaget LM Ericsson (publ), Stockholm (SE)

(72) Inventors: Pål Frenger, Linköping (SE); Emil Björnson, Linköping (SE); Martin Hessler, Linköping (SE); Erik G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/325,271

(22) PCT Filed: Aug. 17, 2016

(86) PCT No.: PCT/SE2016/050764
§ 371 (c)(1),
(2) Date: Feb. 13, 2019

(87) PCT Pub. No.: WO2018/034601
PCT Pub. Date: Feb. 22, 2018

(65) Prior Publication Data
US 2019/0191384 A1   Jun. 20, 2019

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/226* (2013.01); *H04W 52/247* (2013.01); *H04W 52/281* (2013.01); *H04W 52/322* (2013.01)

(58) Field of Classification Search
CPC ............. H04W 52/146; H04W 52/226; H04W 52/247; H04W 52/281; H04W 52/322
(Continued)

(56) References Cited

U.S. PATENT DOCUMENTS

2002/0115464 A1* 8/2002 Hwang ................. H04W 52/40
455/522
2003/0086399 A1* 5/2003 Proctor, Jr. ............ H04B 1/707
370/335
(Continued)

FOREIGN PATENT DOCUMENTS

WO   WO/2002/102095     12/2002
WO   WO 2016/010217 A1  1/2016
WO   WO 2017/209672 A1  12/2017

OTHER PUBLICATIONS

Emil Björnson et al., Random Access Protocol for Massive MIMO: Strongest-User Collision Resolution (SUCR), Departmet of Electrical Engineering (ISY), Linkoping University, Linkoping, Sweden, Department of Electronic Systems, Aalborg University, Aalborg, Denmark, Mar. 11, 2016, 6 Pages.
(Continued)

*Primary Examiner* — Tan H Trinh
(74) *Attorney, Agent, or Firm* — Sage Patent Group (57) ABSTRACT

A method is disclosed of a first wireless communication apparatus of a communication system operating in a hardened channel environment.
The method comprises determining a transmission power to be used by a second wireless communication apparatus of the communication system for transmission of a signal carrying control information, participating in communication involving the signal transmitted using the determined transmission power, and using the determined transmission power to discriminate between the second wireless communication apparatus and one or more third wireless communication apparatus.
(Continued)

The second and one or more third wireless communication apparatuses may be comprised in respective user equipments of a plurality of user equipments associated with a network node of the communication system.

The first wireless communication apparatus may be comprised in the network node. Then, determining the transmission power may comprise determining respective transmission powers to be used by each of the user equipments in the plurality.

19 Claims, 3 Drawing Sheets

(51) Int. Cl.
    *H04W 52/32* (2009.01)
    *H04W 52/22* (2009.01)
    *H04W 52/28* (2009.01)

(58) Field of Classification Search
    USPC .......... 455/69, 522, 513; 370/252, 318, 329, 370/335, 338; 375/220, 224
    See application file for complete search history.

(56) References Cited

U.S. PATENT DOCUMENTS

| | | | | |
|---|---|---|---|---|
| 2004/0218559 A1* | 11/2004 | Kim | ............. | H04W 52/267 370/318 |
| 2007/0291720 A1* | 12/2007 | Lee | ............. | H04W 24/00 370/338 |
| 2009/0093219 A1* | 4/2009 | Katada | ............. | H04W 8/005 455/69 |
| 2011/0263286 A1* | 10/2011 | Damnjanovic | ..... | H04W 74/008 455/513 |
| 2012/0057623 A1* | 3/2012 | Yun | ............. | H04W 52/26 375/220 |
| 2012/0155523 A1* | 6/2012 | Wu | ............. | H04B 17/13 375/224 |
| 2012/0170484 A1* | 7/2012 | Proctor, Jr. | ............. | H04B 1/707 370/252 |
| 2015/0043485 A1* | 2/2015 | Masuda | ............. | H04W 52/346 370/329 |
| 2015/0351022 A1* | 12/2015 | Sakoda | ............. | H04W 8/005 370/329 |
| 2016/0134438 A1* | 5/2016 | Marzetta | ............. | H04L 25/0228 370/315 |
| 2017/0048881 A1* | 2/2017 | Goria | ............. | H04W 72/1226 |

OTHER PUBLICATIONS

International Search Report and Written Opinion of the International Searching Authority, PCT/SE2016/050764, dated Apr. 10, 2017, 14 pages.

Bjornson Emil et al, Random Access Protocol for Massive MIMO: Strongest-User Collision Resolution (SUCR), 2016 IEEE International Conference on Communications (ICC), IEEE, May 22, 2016, Linkoping University. Linkoping, Sweden, XP032921968, pp. 1-6.

* cited by examiner

DISCRIMINATING BETWEEN COMMUNICATION APPARATUSES BASED ON THEIR TRANSMITTED POWER

CROSS REFERENCE TO RELATED APPLICATIONS

This application is a 35 U.S.C. § 371 national stage application of PCT International Application No. PCT/SE2016/050764 filed on Aug. 17, 2016, the disclosure and content of which is incorporated by reference herein in its entirety.

TECHNICAL FIELD

The present invention relates generally to the field of wireless communication. More particularly, it relates to discrimination between different wireless communication apparatuses using a shared channel.

BACKGROUND

Wireless (e.g. mobile) data traffic amounts are growing rapidly and one difficulty encountered when attempting to deliver high data rates is the natural variability (e.g. fading) of the radio propagation channels.

Power control and adaptive modulation and coding are classical methods that adapt the signal quality and data rates to current radio channel conditions, and may be applied in one or both of the time dimension and the frequency dimension. The adaptation needs to be determined over the same time/frequency scale as the channel variation manifests itself, which may typically correspond to a few milliseconds and a few hundred kHz, and may hence require cumbersome channel estimation and feedback mechanisms.

In various situations, radio channel conditions may be stable or substantially stable over time and/or frequency. Such conditions may be referred to as "non-fading" channel conditions or a hardened channel environment, and they may appear due to the physical properties of a radio channel (as may be the case, for example, for a mini-link channel) or as a result of signal processing (as may be the case, for example, for communication systems applying massive MIMO (multiple-input, multiple-output)). For example, channel gain variation in a 256 antenna system may be expected to be in the order of 1 dB, while a traditional system (i.e. one with a low amount of antennas) under the same assumptions typically experiences more than 20 dB channel gain variation. Even smaller channel gain variation may be achieved by limiting the time and/or frequency utilization.

Network nodes equipped with a large number of antennas, as is the case for communication systems applying massive MIMO, can simultaneously schedule multiple user equipments at the same time and/or in the same frequency band and communicate with these user equipments using linear signal processing approaches (for example based on maximum-ratio (MR) and/or zero-forcing (ZF) algorithms). This enables handling of increasing data traffic amounts without necessarily requiring denser network deployment. Furthermore, each network node can control the interference that it causes to its local area in communication systems applying massive MIMO.

Using a large number of antennas at the network node and appropriately chosen precoding results in an effective channel between the network node and the user equipment (UE) that is stable or substantially stable over time and frequency. An effective channel having this property may be referred to as a hardened channel environment, and the approach to achieve it may be referred to as channel hardening.

Channel hardening can be utilized to simplify power control and adaptive modulation and coding. Since the channel variation is removed or at least (significantly) reduced by channel hardening, the adaptation can be determined over a much larger time/frequency scale, which is a benefit of massive MIMO over conventional radio access technologies.

In a massive MIMO system, the capacity increases with the number of antennas for all channels that utilize the channel state information (CSI) for precoding, or beam forming.

However, channels that do not utilize transmitter side CSI do not demonstrate this capacity advantage. Examples of channels that do not utilize CSI are some control channels such as scheduling request (SR) channels and random access channels (RACH) in UMTS LTE (Universal Mobile Telecommunication Standard, Long Term Evolution, advocated by the Third Generation Partnership Program—3GPP). Thus, when traffic increases the relative overhead of such channels increases also. Typically, the resources dedicated to such channels need to increase substantially proportionally with the number of user equipments to avoid a high collision risk (e.g. high in relation to an accepted error rate; if, for example, the acceptable error rate is 1% the collision rate must be much smaller and a collision risk may be considered to be high if it is above, for example, 0.1%), while this is not the case for resources dedicated to channels that utilize CSI.

Therefore, there is a need for approaches to reduce the relative overhead of channels that do not utilize transmitter side CSI in massive MIMO systems.

More generally, there is a need for approaches that enable or facilitate discrimination between different transmitting apparatuses (e.g. resolving of collisions).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should be noted that the term CSI is used broadly herein to denote channel sounding and/or feedback regarding properties of a channel, and is not meant to be limiting to the CSI of UMTS LTE only.

The term user equipment is used herein as referring to any wireless communication device that may be used in relation to a wireless communication system (e.g. a mobile terminal), and is not to be construed as limited to a user equipment of UMTS LTE only.

When referring herein to an identity, a UE identity, an identity of a wireless communication apparatus or user equipment, or similar expressions, such expressions are meant to denote a broad interpretation of which apparatus is under consideration including—but not limited to—a UE identity (UE ID) as referred to in the context of 3GPP standardization.

Furthermore, UMTS LTE is used herein as an illustrative example of a system where embodiments may be applicable, which is neither to be construed as limiting. Contrarily, embodiments may be equally applicable in other communication systems where similar problems arise.

The use of the terminology "RACH" and "SR" herein is meant to refer to the logical channels RACH and SR as well as to the corresponding physical channels carrying the logical channels, as applicable. Typically, logical wording is meant to cover all cases independently of which physical channel is carrying the logical function. For example, in UMTS LTE the random access message may be carried on the physical random access channel (PRACH) and the scheduling request message may be carried on the physical uplink control channel (PUCCH) or on PRACH. PUCCH is an assigned channel were a UE can send an SR if it has corresponding resource and is uplink synchronized. PRACH can be used to send SR and enable uplink synchronization if the UE is not uplink synchronized.

It is an object of some embodiments to solve or mitigate at least some of the above or other disadvantages. It should be noted that embodiments may be applicable in any situation where discrimination between transmitting apparatuses is desired and a hardened channel environment is experienced. Thus, the advantage of reducing the relative overhead of channels that do not utilize CSI should not be construed as limiting.

According to a first aspect, this is achieved by a method of a first wireless communication apparatus of a communication system operating in a hardened channel environment.

The method comprises determining a transmission power to be used by a second wireless communication apparatus of the communication system for transmission of a signal carrying control information, participating in communication involving the signal transmitted using the determined transmission power, and using the determined transmission power to discriminate between the second wireless communication apparatus and one or more third wireless communication apparatus.

A hardened channel environment may comprise a communication situation where the communication links used experience no or low channel variations. This situation may be due to properties of the physical radio communication channel itself and/or may be achieved via signal processing approaches (e.g. massive MIMO as exemplified above).

Low channel variations may be defined as variations that are smaller than a maximum channel variation. The maximum channel variation may be related to (e.g. substantially smaller than) the amplitude difference used to encode information. For example, the maximum channel variation may be equal to the amplitude difference scaled by a factor that is (substantially) smaller than 1. The maximum channel variation may be such that the error probability that one power state is estimated (due to channel variations) as another power state at the receiver is kept below an error probability threshold. The variations that are compared to the maximum channel variation may, for example, be determined using the standard deviation for underlying Gaussian random variables in a Rayleigh channel.

Typically, a hardened channel environment may refer to a situation where a minimum difference between possible transmission powers to be used is larger than a value associated with the channel variation. The value may, for example, be a difference between a maximum and minimum expected path gain, a standard deviation of the path gain, or a scaled version thereof.

Communication involving the signal transmitted using the determined transmission power may, for example, comprise transmitting and/or receiving the signal.

Discriminating between wireless communication apparatuses may, for example, comprise resolving a collision between wireless communication apparatuses and/or determining the identity of one or more wireless communication apparatuses. A collision may, for example, be resolved using a strongest user collision resolution (SUCR) approach.

In some embodiments, the transmission power may be determined as a transmission power offset from a nominal transmission power.

The determined transmission power may be specific for the second wireless communication apparatus according to some embodiments. The determined transmission power for the second wireless communication apparatus may differ from respective transmission powers to be used by the one or more third wireless communication apparatuses.

In some embodiments, determining the transmission power may comprise random or pseudo-random determination of the transmission power. For example, the determination may comprise randomly selecting a transmission power (or transmission power offset) among a plurality of possible transmission powers (or transmission power offsets).

The determined transmission power may vary over time according to a transmission power pattern in some embodiments. In such embodiments, determining the transmission power may comprise determining a transmission power pattern. For example, the determination may comprise randomly selecting a transmission power pattern among a plurality of possible transmission power patterns.

In some embodiments, the communication system may apply massive multiple-input, multiple-output (massive MIMO) to provide the hardened channel environment. Massive MIMO may, in some embodiments, refer to that a large number of antennas are applied. A large number may, for example, comprise at least ten times the (maximum) number of user equipments associated with a network node or at least 64 antenna elements. Other, known or future, definitions of massive MIMO may also be applicable.

The control information may comprise one or more of a random access channel (RACH) and a scheduling request (SR) according to some embodiments. Typically, the control information may be information sent in an uplink between a user equipment and a network node.

In some embodiments, using the determined transmission power to discriminate between the second wireless communication apparatus and the one or more third wireless communication apparatus may comprise resolving a collision between the second wireless communication apparatus and the one or more third wireless communication apparatus using a strongest user collision resolution (SUCR) approach.

The SUCR approach is described, for example, in Björnsson, Emil, et al., "Random Access Protocol for Massive MIMO: Strongest-User Collision Resolution (SUCR)" in proceedings of IEEE International Conference on Communications (ICC), May 23-26, Kuala Lumpur, Malaysia, 2016, pp. 1-6.

In some embodiments, using a SUCR approach may comprise a network node receiving the signal transmitted using the determined transmission power, performing a channel estimation based on the received signal and transmitting a response using precoding that is based on the channel estimation. The response may, for example, be an ACK/NACK message. If a collision between the second wireless communication apparatus and one or more third wireless communication apparatuses occurred in the transmission of the signal, the channel estimation is a superposition of a channel between each of these wireless communication apparatuses and the network node.

Using a SUCR approach may, in some embodiments, comprise the second wireless communication apparatus receiving the response and comparing a power (or energy) of the response to a power (or energy) threshold. Typically, the power threshold may be associated with (e.g. may be equal to a possibly scaled version of) the determined transmission power used by the second wireless communication apparatus.

If the received power exceeds the threshold, the second wireless communication apparatus may determine that its signal when received by the network node was stronger than signals of the one or more third wireless communication apparatuses and resolve the collision by reacting to the response according to a normal procedure (e.g. retransmitting if the response was a NACK message and transmitting a new packet if the response was an ACK message).

If the received power does not exceed the threshold, the second wireless communication apparatus may determine that its signal when received by the network node was weaker than at least one of the signals of the one or more third wireless communication apparatuses and resolve the collision by admitting the one or more third wireless communication apparatuses to react to the response. Admitting the one or more third wireless communication apparatuses to react to the response may, for example, comprise retransmitting the signal using another transmission power pattern or other transmission signature. Alternatively or additionally, admitting the one or more third wireless communication apparatuses to reacting to the response may, for example, comprise retransmitting the signal after a back-off period.

In some embodiments, the determination of the transmission power may be based on an identity of the second wireless communication apparatus.

The first wireless communication apparatus may be comprised in a network node according to some embodiments, and the second and one or more third wireless communication apparatuses may be comprised in respective user equipments of a plurality of user equipments associated with the network node. Then, determining the transmission power to be used by the second wireless communication apparatus may comprise determining respective transmission powers to be used by each of the user equipments in the plurality of user equipments, and participating in communication involving the signal transmitted using the determined transmission power may comprise receiving the signal.

In some embodiments, determining respective transmission powers to be used by each of the user equipments in the plurality of user equipments may comprise assigning the respective transmission powers in accordance with a priority among the user equipments, such that one user equipment is assigned a higher transmission power than an other user equipment if the one user equipment has higher priority than the other user equipment.

The determination of the transmission power may be based on an identity of the second wireless communication apparatus according to some embodiments. Then, using the determined transmission power to discriminate between the second wireless communication apparatus and the one or more third wireless communication apparatus may comprise determining the identity of at least the second wireless communication apparatus based on the respective determined transmission powers and on channel estimates in relation to each of the user equipments. In some embodiments, the identities of the one or more third wireless communication apparatuses are also determined.

When the first wireless communication apparatus is comprised in a network node, using the determined transmission power to discriminate between the second wireless communication apparatus and the one or more third wireless communication apparatus may comprise resolving a collision between the second wireless communication apparatus and the one or more third wireless communication apparatus by performing a channel estimation based on the received signal, wherein the channel estimation is a superposition of a channel between each of the wireless communication apparatuses involved in the collision, and transmitting a response using precoding that is based on the channel estimation. This may be seen as an embodiment using the SUCR approach as mentioned and exemplified herein.

The first and second wireless communication apparatus may, according to some embodiments, be one and the same wireless communication apparatus comprised in a user equipment of a plurality of user equipments associated with a network node of the communication system. The one or more third wireless communication apparatuses may each be comprised in respective user equipments of the plurality of user equipments. Then, participating in communication involving the signal transmitted using the determined transmission power may comprise transmitting the signal.

In some embodiments, the transmission power may be determined based on a status of a transmission buffer of the second wireless communication apparatus. For example, the status may comprise one or more of: an amount of data in the transmission buffer, and a priority of data in the transmission buffer.

In some embodiments, the transmission power may be determined based on a collision risk. For example, the collision risk may be estimated based on how many wireless communication apparatuses are allowed to use the same communication channel as the second wireless communication apparatus.

Combinations of transmission buffer status and collision risk may also be considered for the determination of the transmission power.

When the first and second wireless communication apparatus are one and the same wireless communication apparatus comprised in a user equipment, using the determined transmission power to discriminate between the second wireless communication apparatus and the one or more third wireless communication apparatus may comprise resolving a collision between the second wireless communication apparatus and the one or more third wireless communication apparatus by receiving a response from the network node (the response being transmitted using precoding based on a channel estimation, the channel estimation being based on the transmitted signal, wherein the channel estimation is a superposition of a channel between each of the wireless communication apparatuses involved in the collision) and determining whether or not the response is for the first wireless communication apparatus based on a comparison of a power of the response to a threshold. This may be seen as an embodiment using the SUCR approach as mentioned and exemplified herein.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is a first wireless communication apparatus of a communication system operating in a hardened channel environment. The first wireless communication apparatus comprises a controller adapted to cause determination of a transmission power to be used by a second wireless communication apparatus of the communication system for transmission of a signal carrying control information, participation in communication involving the signal transmitted using the determined transmission power, and use of the determined transmission power to discriminate between the second wireless communication apparatus and one or more third wireless communication apparatus.

The determination of the transmission power may be performed by a determiner comprised in, or external to but associated with, the controller.

The participation in communication involving the signal may be performed by a transceiver comprised in, or external to but associated with, the controller.

The use of the determined transmission power to discriminate between the second wireless communication apparatus and one or more third wireless communication apparatus may be performed by a discriminator comprised in, or external to but associated with, the controller.

A fourth aspect is a first wireless communication apparatus of a communication system operating in a hardened channel environment. The first wireless communication apparatus comprises a processor and a memory, said memory comprising instructions executable by the processor whereby the first wireless communication apparatus is operative to determine a transmission power to be used by a second wireless communication apparatus of the communication system for transmission of a signal carrying control information, participate in communication involving the signal transmitted using the determined transmission power, and use the determined transmission power to discriminate between the second wireless communication apparatus and one or more third wireless communication apparatus.

A fifth aspect is a first wireless communication apparatus of a communication system operating in a hardened channel environment. The first wireless communication apparatus comprises a determiner, a transceiver and a discriminator. The determiner is adapted to determine a transmission power to be used by a second wireless communication apparatus of the communication system for transmission of a signal carrying control information. The transceiver is adapted to participate in communication involving the signal transmitted using the determined transmission power. The discriminator is adapted to use the determined transmission power to discriminate between the second wireless communication apparatus and one or more third wireless communication apparatus.

A sixth aspect is a network node comprising the first wireless communication apparatus according to the third, fourth or fifth aspect, and a seven aspect is a user equipment comprising the first wireless communication apparatus according to the third, fourth or fifth aspect.

In some embodiments, any of the above aspects may additionally have features identical with or corresponding to any of the various features as explained above for any of the other aspects.

An advantage of some embodiments is that discrimination between different transmitting apparatuses may be achieved.

An advantage of some embodiments is that the relative overhead of channels that do not utilize transmitter side CSI is reduced in massive MIMO systems.

Another advantage of some embodiments is that collisions may be resolved in an efficient manner.

Yet another advantage of some embodiments is that identities of all transmitting wireless communication apparatuses may be determined even if a collision occurred.

As an example, the capacity of e.g. SR and/or RACH can be significantly improved in a massive MIMO system for a given amount of resources, thus causing less overhead and/or increasing capacity of such channels.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a hardened channel environment is utilized to enable discrimination between transmitting wireless communication apparatuses (e.g. user equipments) based on their respective transmission powers.

The transmission power to be used by respective wireless communication apparatuses may be determined by a network node and communicated to the wireless communication apparatuses. Alternatively, the transmission power to be used by a wireless communication apparatus may be determined by the wireless communication apparatus itself.

Determination of the transmission power to be used may be random (or pseudo-random), or may be based on respective identities of the wireless communication apparatuses, on a priority hierarchy among the wireless communication apparatuses (or the service they are using, or the data they are to transmit, etc.), on a transmission buffer status of the wireless communication apparatus, on a collision risk, or on a combination thereof. Other examples of how the transmission power to be used may be determined may also be applicable.

The transmission power to be used may be expressed as an absolute power value or as an offset from a nominal power value. For example, in the context of 3GPP standardization (see in particular 3GPP technical specification (TS) 36.213, sections 5.1.1.1, 5.1.2.1, 5.1.3.1) an extra offset (e.g. in the form of an additional—positive or negative—term) may be used in a power control formula for one or more of PUCCH (physical uplink control channel, conveying SR), RAR (random access response), PUSCH (physical uplink shared channel), and SRS (sounding reference symbol). This additional term may, thus, be used as a UE identifier (or for conveying other information) as elaborated on herein.

Further, the transmission power may vary over time in accordance with a transmission power pattern.

The discrimination between the wireless communication apparatuses utilizes the hardened channel environment and the used transmission power. The discrimination may, for example, comprise application of a SUCR approach to resolve collisions and/or a determination of the identity of the transmitting wireless communication apparatuses as will be exemplified in the following.

In one example, a UE-specific and time-varying power offset is used for SR and/or RACH transmissions in a massive MIMO system, and the power offset is used for contention (collision) resolution, thereby enabling increased utilization of the resource used for SR and/or RACH transmissions and. Thus, less overhead due to SR and/or RACH transmissions is caused in the system.

Figure 1:
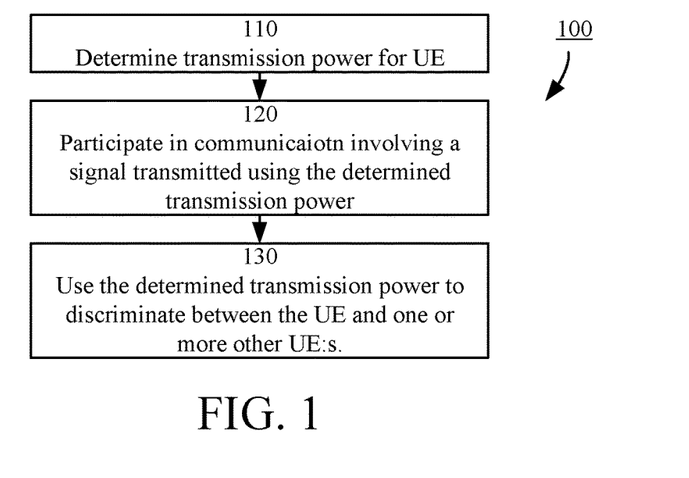
FIG. 1 is a flowchart illustrating example method steps according to some embodiments.

FIG. 1 illustrates an example method 100 of a first wireless communication apparatus of a communication system operating in a hardened channel environment according to some embodiments.

The method comprises, in step 110, determining a transmission power to be used by a second wireless communication apparatus (a user equipment, UE) of the communication system for transmission of a signal carrying control information.

The method also comprises, in step 120, participating in communication involving the signal transmitted using the determined transmission power. The participation in communication comprises transmitting or receiving the signal.

In step 130, the determined transmission power is used to discriminate between the second wireless communication apparatus and one or more third wireless communication apparatus.

Figure 3:
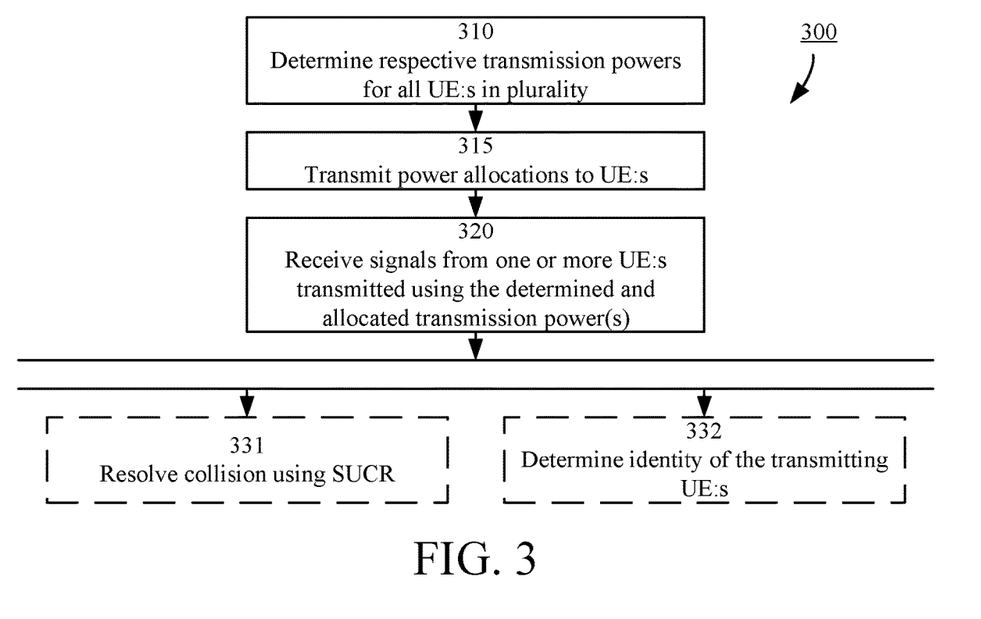
FIG. 3 is a flowchart illustrating example method steps according to some embodiments.
Figure 4:
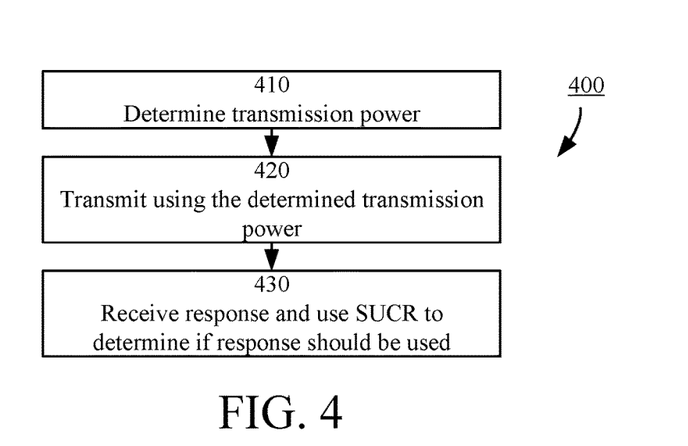
FIG. 4 is a flowchart illustrating example method steps according to some embodiments.

As will be exemplified in connection to FIGS. 3 and 4, the method 100 may be performed by a network node or by a user equipment. Thus, the first wireless communication apparatus may be comprised in one of the network node and the user equipment. Further, the second and one or more third wireless communication apparatuses may be comprised in respective user equipments of a plurality of user equipments associated with a/the network node of the communication system.

When the first wireless communication apparatus is comprised in a network node, determining the transmission power may comprise determining respective transmission powers to be used by each of the user equipments in the plurality, and participating in communication may comprise receiving the signal transmitted using the determined transmission power.

When the first wireless communication apparatus is comprised in a user equipment, the first and second wireless communication apparatuses may be one and the same wireless communication apparatus, and participating in communication may comprise transmitting the signal using the determined transmission power.

One way to use the determined transmission power to discriminate between wireless communication apparatuses is to apply a SUCR approach, for example as described in Björnsson, Emil, et al., "Random Access Protocol for Massive MIMO: Strongest-User Collision Resolution (SUCR)" mentioned above.

Figure 2:
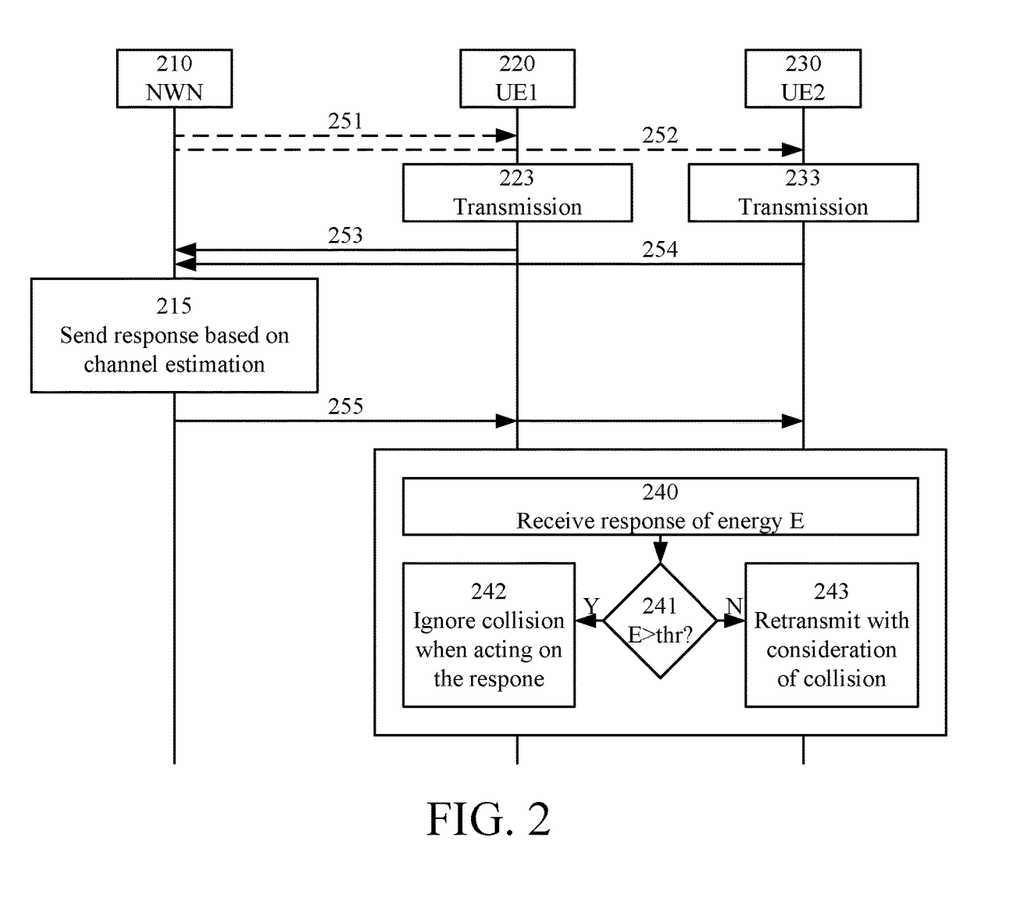
FIG. 2 is a combined flowchart and signaling diagram illustrating example method steps and signaling according to some embodiments.

FIG. 2 illustrates example method steps and signaling between a network node (NWN) 210 and two user equipments (UE1, UE2) 220, 230 when SUCR is applied according to some embodiments. This example uses energy in the threshold comparison, but using power values is equally applicable.

In this example, the network node starts with allocating 251, 252 transmission powers to each of the two user equipments. This allocation may be performed as part of step 110 when the method 100 is performed by a network node (NWN 210). If the method 100 is performed by a user equipment (any or both of UE1 220 and UE2 230), the allocation 251, 252 may be absent and each user equipment may determine their own transmission power.

The example continues by each of the user equipments performing a transmission (e.g. RACH or SR) using their respective allocated transmission power as illustrated by 223, 253 and 233, 254.

The transmissions are received by the network node and the network node estimates the channel over which the transmissions were received. If a collision occurred, the channel estimate is a superposition of the channel between UE1 and the network node and the channel between UE2 and the network node, weighted by the respective transmission powers used.

Then the network node sends a response (e.g. a random access response, a scheduling grant, or an ACK/NACK, as applicable) to the received transmissions as illustrated by 215, 255. The response is based on the channel estimate. If the channel estimate is a superposition the response may, for example, be transmitted using a beam that lies between the locations of UE1 and UE2 and closer to the user equipment that used the highest transmission power of the two.

When the response is received at each of the user equipments as illustrated by 240, the received energy E (or, alternatively, the received power) may be used to resolve any collision. For example, the received energy may be compared to a threshold (thr) as illustrated by 241.

If the received energy exceeds the threshold (Y-path out of step 241) that user equipment may conclude that there was no collision or that, if a collision occurred, the user equipment used the highest transmission power among the colliding user equipments. Then, the user equipment may react to the response in a default manner, ignoring any collision that may have occurred as illustrated by 242.

If the received energy does not exceed the threshold (N-path out of step 241) that user equipment may conclude that there was a collision and that the user equipment did not use the highest transmission power among the colliding user equipments. Then, the user equipment may resolve the collision by admitting the other user equipment (having used the highest transmission power) to react to the response, and by retransmitting the transmission of 233 as illustrated by 242. Retransmission may, for example, comprise using a back-off period that allows the other user equipment to complete its correspondence with the network node according to the default manner. Alternatively or additionally, retransmission may comprise using another transmission signature or transmission power pattern.

Another way to use the determined transmission power to discriminate between wireless communication apparatuses (user equipments) is to use respective transmission powers of the user equipments to determine their identities. For example, the network node may compare a power sum for each of a number of hypotheses regarding transmitting UE identities to a received power and minimize the difference. A more detailed example of such a minimization problem will be given later herein. This discrimination may be combined with the SUCR approach according to some embodiments.

For example, if the network node has determined respective transmission powers for a group of user equipments, the received signal may be used together with the knowledge regarding the transmission powers and the hardened channel situation to set up a minimization problem, the solution of which is an estimate of which user equipments contributed to the received signal and hence took part in a possible collision. An identity sequence of each user equipment being embedded in the signal may enable such a discrimination approach.

FIG. 3 illustrates an example method 300 according to some embodiments. The method 300 may be regarded as an example implementation of the method 100 when the first wireless communication apparatus performing the method 300 is comprised in a network node and the second and one or more third wireless communication apparatuses are comprised in respective user equipments of a plurality of user equipments associated with the network node.

The method comprises, in step 310 (compare with step 110), determining respective transmission powers to be used by each user equipment of the plurality. The transmission powers may, for example, be assigned in accordance with a prioritization among the user equipments, the services they are using, or data to be transmitted by them. Each of the user equipments is informed of the determined transmission power allocation as illustrated in step 315.

The method also comprises, in step 320 (compare with step 120), receiving signals transmitted, using the determined and allocated transmission powers, from one or more of the user equipments of the plurality.

The determined transmission powers are then used to discriminate between the user equipments contributing to the received signal (compare with step 130). The discrimination may comprise either or both of resolving a collision using SUCR (step 331, compare with step 215) and determining the identities of transmitting user equipments (step 332), both of which have been elaborated on above.

Figure illustrates an example method 400 according to some embodiments. The method 400 may be regarded as an example implementation of the method 100 when the first wireless communication apparatus performing the method 400 is comprised in a user equipment, the second and one or more third wireless communication apparatuses are also comprised in respective user equipments of a plurality, and the first and second wireless communication apparatuses are one and the same (i.e. the user equipment determines its own transmission power).

The method comprises, in step 410 (compare with step 110), determining a transmission power to be used by the user equipment. The transmission power may, for example, be determined in a random (or pseudo random) manner or based on a transmission buffer status (amount of data in the buffer, priority of data in the buffer, etc.). Alternatively or additionally, the transmission power may be determined based on a collision risk. For example, the collision risk may be estimated based on how many user equipments are allowed to use the same communication channel.

The method also comprises, in step 420 (compare with step 120), transmitting a signal using the determined transmission powers to the network node.

A received response is then used in a discrimination between the user equipment and other user equipments of a potential collision (compare with step 130). The discrimination may comprise resolving a collision using SUCR to determine whether or not to use the received response (step 430) as has been elaborated on above (compare with steps 241, 242, 243).

Figure 5:
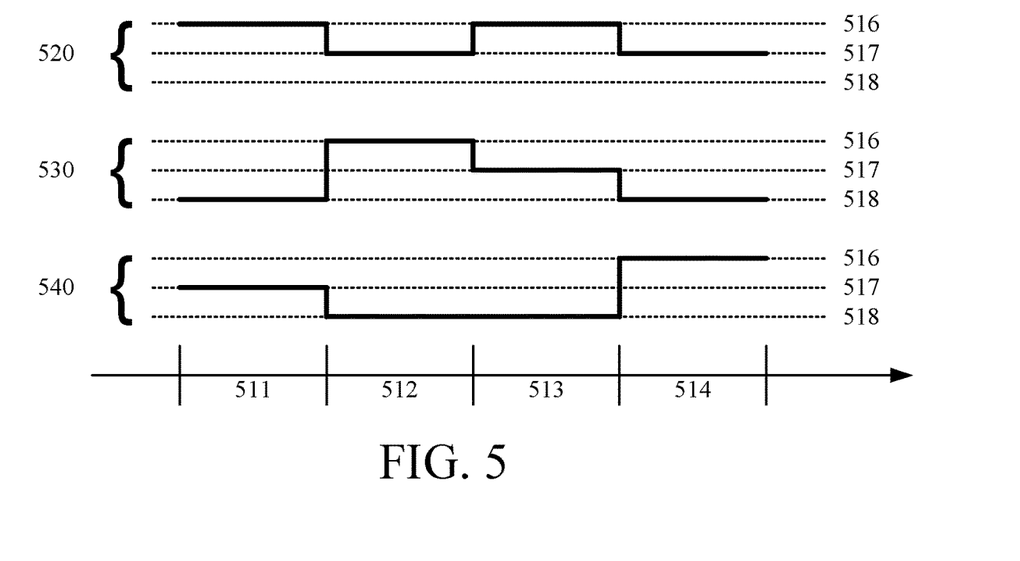
FIG. 5 is a schematic diagram illustrating example transmission powers according to some embodiments.

FIG. 5 illustrates example transmission power determinations for three user equipments 520, 530, 540, wherein the transmission powers vary over time illustrated by four consecutive transmission time intervals (TTI:s) 511, 512, 513, 514.

In this example, the network node can allocate three different (absolute or relative, in terms of offset) transmission power levels 516, 517, 518. In the first TTI 511, UE 520 is allocated the highest transmission power level 516, UE 530 is allocated the lowest transmission power level 518, and UE 540 is allocated the mid transmission power level 517. In the second TTI 512, UE 520 is allocated the mid transmission power level 517, UE 530 is allocated the highest transmission power level 516, and UE 540 is allocated the lowest transmission power level 518. In the third TTI 513, UE 520 is allocated the highest transmission power level 516, UE 530 is allocated the mid transmission power level 517, and UE 540 is allocated the lowest transmission power level 518. In the fourth TTI 514, UE 520 is allocated the mid transmission power level 517, UE 530 is allocated the lowest transmission power level 518, and UE 540 is allocated the highest transmission power level 516. The transmission power pattern may be repeated with a periodicity of 4 TTI in some embodiments.

It may be observed that in this example, full discrimination (e.g. in terms of identity determination) between the user equipments 520, 530, 540 is possible since the each user equipment always has a different transmission power level than the other two user equipments.

It may also be observed that user equipment 520 has been given a higher priority that the other two user equipments since its average transmission power is higher than that of the other two.

Figure 6:
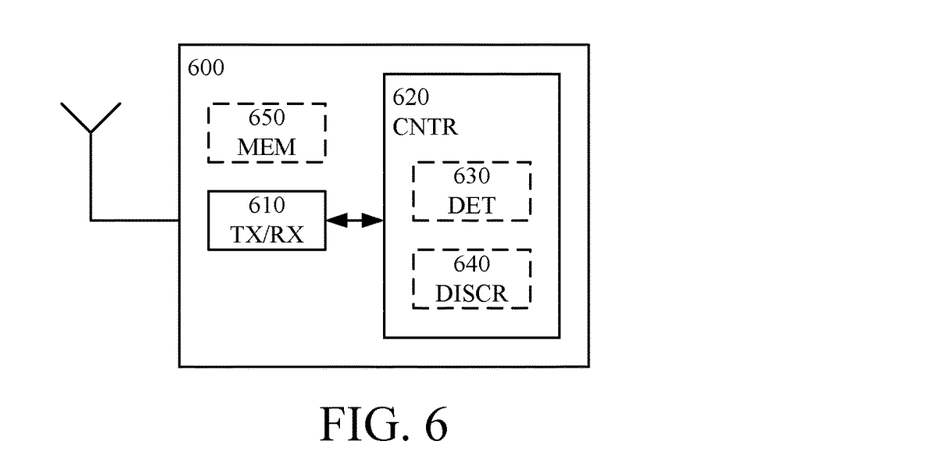
FIG. 6 is a schematic block diagram illustrating an example apparatus according to some embodiments.

FIG. 6 is a schematic drawing illustrating an example first wireless communication apparatus 600 of a communication system operating in a hardened channel environment. The example apparatus 600 may be comprised in a network node or a user equipment, as applicable, and may, for example, be adapted to perform one or more of the example methods as described above (e.g. in connection with any of the FIGS. 1-4). The detailed function described and exemplified in connection to the methods applies mutatis mutandis to the apparatus 600.

The apparatus 600 comprises a controller (CNTR) 620 and is associated with (or comprises) a transceiver (TX/RX) 610. The controller is adapted to cause determination (e.g. by a determiner (DET) 630) of a transmission power to be used by a second wireless communication apparatus of the communication system for transmission of a signal. The controller is also adapted to cause (e.g. via the transceiver 610) participation in communication involving the signal transmitted using the determined transmission power. The controller is also adapted to cause use of the determined transmission power to discriminate (e.g. by a discriminator (DISCR) 640) between the second wireless communication apparatus and one or more third wireless communication apparatus. The determiner and/or the discriminator may be comprised in, or external to but associated with, the controller according to various embodiments. The controller 620 may be implemented by a processor and a memory (MEM) 650 may be also comprised in the apparatus 600, which memory 650 comprises instructions executable by the processor 620 to the operation referred to herein.

Embodiment may be particularly beneficial in 3GPP fifth generation (5G) systems, wherein they may, for example, be applied as SR/RACH power control based on UE identity.

Typically, transmission power determination involves assigning a UE specific transmission power, which may or may not vary over time. In some embodiments, each UE has a transmission power that differs from that of other UE:s. In some embodiments, the transmission power of a UE may coincide with that of one or more, but not all, other UE:s.

Generally, embodiments utilize the phenomenon of channel hardening as described above. A hardened channel environment leads to that the signal power/energy (e.g. pilot of SR/RACH) received at the network node is more or less predetermined by the transmission power of the user equipment. Thus, a user equipment may modulate information onto the transmission power that can be recognized by the network node. Alternatively or additionally, prioritization by the network among user equipments may be enabled by allocation of different transmission powers to different users. Yet alternatively or additionally, the network may over-allocate the number of user equipments on resources such as SR/RACH, thereby increasing capacity, since collisions may be resolved via the different transmission powers.

In some embodiments the collision resolutions may be random or pseudo random (e.g. using a pseudo random power allocation based on UE identity on RACH). In these embodiments collision resolution can be implemented via a SUCR approach.

In some embodiments the collision resolution may be planned (e.g. using power allocation based on prioritizations on SR resources). In such embodiments, the power distribution of the received signal can be used by the network node to determine UE identities and/or collision resolution can be implemented via a SUCR approach.

In an example where the network node uses the transmission power allocation (and consequently the power distribution of the received signal) to determine UE identities, the network node may have some knowledge about the channel conditions between UE and network node (e.g. an expected received power from each UE if default transmission power is used). Such an example is particularly applicable for SR and assigned RACH resources (sometimes referred to as UL synchronization signals).

In an example of a massive MIMO system utilize the channel hardening property, let $\beta_i$ be the average nominal received power of $UE_i$ and let $h_i$ be the M×1 channel vector of $UE_i$. The channel hardening implies that $\|h_i\|^2 \approx M\beta_i$. If another UE ($UE_k$) is modeled in the corresponding way, it follows that $\|h_i + h_k\|^2 \approx M(\beta_i + \beta_k)$.

Let C be the index set of the UE:s that transmit signals to be identified, and let $s_i = [s_{i,1}, \ldots, s_{i,\tau}]$ be the $\tau$-length sequence transmitted by $UE_i$ with $i \in C$, where the sequence is determined by a UE power offset (the determined transmission power). The received signal at the base station will be $y_t = \sum_{i \in C} h_i s_{i,t}$, $t = 1, \ldots, \tau$, which according to the channel hardening property satisfies $\|y_t\|^2 \approx \sum_{i \in C} M\beta_i s_{i,t}^2$.

If U is the set of admissible UE:s from which the base station needs to identify the subset C, this identification can be carried out by formulating an optimization problem. One example of such a problem formulation is a least-squares problem:

$$\min_{\alpha_i \in [0,1]: i \in U} \sum_{t=1}^{\tau} \left| \|y_t\|^2 - \sum_{i \in U} \alpha_i M \beta_i s_{i,t}^2 \right|^2$$

where $\alpha_i = 1$ represents the hypothesis that $UE_i$ is active and $\alpha_i = 0$ represents the hypothesis that $UE_i$ is idle. This problem can be solved by any suitable method for least-squares optimization, leading to an identification of the active UE:s. This is only one possible algorithm and other suitable algorithms (e.g. other metrics) may be used to determine the UE identities.

When collision resolution is UE-based (e.g. via SUCR), the network node may not necessarily be aware of whether there is a collision or of the identities of transmitting UE:s. Such an example is particularly applicable for RACH or when a RACH is used as a SR. The network node may perform the SUCR protocol to transmit a response which is beam formed using the received signal, e.g. SR/RACH pilot (compare with 331 and 215, 255), and the UE may use the received power/energy of the response to determine whether or not the response is for its own use or not as described above.

In embodiments where the network node determines transmission powers of the UE:s (e.g. in terms of power offsets), the power offsets may be determined in relation to channel variations. Even in the case of channel hardening, there may be some channel variation (e.g. due to interference, path gain load, number of antennas, etc.), and the power offsets may be chosen to compensate for such variations if they are know or estimated by the network node. For example, if the channel variation is expected to be less than X dB with high probability (e.g. 99.9%) then the power offset may be selected to be slightly larger than X dB.

Alternatively or additionally, the network node may determine the UE identities as elaborated on above and the power offsets may be adjusted to optimize probabilities of the threshold detector as described in connection with SUCR (compare with step 241). For example, if one UE is exhibiting larger and/or faster variations than other UE:s it may be assigned a higher transmission power (larger offset) than the other UE:s. Such an approach may lower the error probability of the threshold detector and thereby compensate for the increased error probability caused by the larger and/or faster variations.

When a UE determines its own transmission power (e.g. in terms of an offset) and thereby performs amplitude modulation on a sequence transmission (such as SR or PRACH), this can be used for communicating other types of information than user identity.

For example, a transmission buffer status reporting (BSR) may be embedded in amplitude modulation via the choice of transmission power. If the amount of data in the transmission buffer is high the UE may send an SR with high power (positive power offset) and if the amount of data in the transmission buffer is low the UE may send an SR with a low power (negative power offset).

Alternatively or additionally, priority of the data in the transmission buffer may be used to determine the transmission power.

If two (or more) user equipment transmissions collide, the user equipment with the largest amount of data and/or the highest data priority will have selected the highest transmit power and will consequently be most likely to win the contention.

The amplitude modulation may, according to some embodiments, depend on whether or not the UE is the only UE assigned to a specific SR/PRACH resource. If a UE is the only UE on a resource, amplitude modulation as elaborated on above can be used for communicating BSR or data priority, for example, and if a UE is not the only UE on a resource, amplitude modulation may be used to convey a UE identity.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic device (such as a user equipment or a network node) comprising a wireless communication apparatus (arrangements/circuitry/logic/etc.) and/or performing methods according to any of the embodiments. A user equipment may, for example, be a wireless communication terminal, a mobile telephone, a smartphone, a lap-top, or the like. A network node may, for example, be a base station, a radio access node, or the like.

Figure 7:
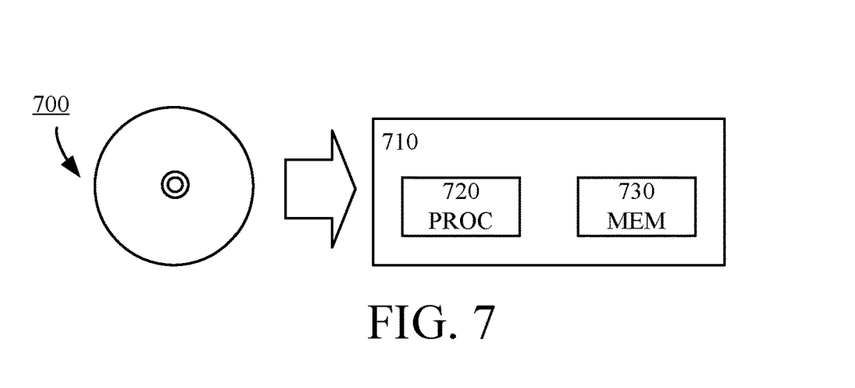
FIG. 7 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 700 illustrated in FIG. 7. The computer readable medium may have stored thereon a computer program comprising program instructions. The computer program may be loadable into a data-processing unit (PROC) 720, which may, for example, be comprised in an electronic device 710, such as a user equipment or a network node. When loaded into the data-processing unit, the computer program may be stored in a memory (MEM) 730 associated with or integral to the data-processing unit. According to some embodiments, the computer program may, when loaded into and run by the data-processing unit, cause execution of method steps according to, for example, the methods shown in any of the FIGS. 1-4.

Reference has been made herein to various embodiments. However, a person skilled in the art would recognize numerous variations to the described embodiments that would still fall within the scope of the claims.

For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a first wireless communication apparatus of a communication system operating in a hardened channel environment, the method comprising:
determining a transmission power to be used by a second wireless communication apparatus of the communication system for transmission of a signal carrying control information by determining respective transmission powers to be used by each of the user equipments in the plurality of user equipments;
participating in communication involving the signal transmitted using the determined transmission power upon receiving the signal; and
using the determined transmission power to discriminate between the second wireless communication apparatus and one or more third wireless communication apparatus,
wherein using the determined transmission power to discriminate between the second wireless communication apparatus and the one or more third wireless communication apparatus comprises resolving a collision between the second wireless communication apparatus and the one or more third wireless communication apparatus by:
performing a channel estimation based on the received signal, wherein the channel estimation is a superposition of a channel between each of the wireless communication apparatuses involved in the collision; and
transmitting a response using precoding that is based on the channel estimation.

2. The method of claim 1 wherein the determined transmission power varies over time according to a transmission power pattern.

3. The method of claim 1, wherein the communication system applies massive multiple-input, multiple-output (massive MIMO) to provide the hardened channel environment.

4. The method of claim 1, wherein the control information comprises one or more of a random access channel (RACH) and a scheduling request (SR).

5. The method of claim 1, wherein the determination of the transmission power is based on an identity of the second wireless communication apparatus.

6. The method of claim 1, wherein the first wireless communication apparatus is comprised in a network node and the second and one or more third wireless communication apparatuses are comprised in respective user equipments of a plurality of user equipments associated with the network node.

7. The method of claim 6 wherein determining respective transmission powers to be used by each of the user equipments in the plurality of user equipments comprises assigning the respective transmission powers in accordance with a priority among the user equipments, such that one user equipment is assigned a higher transmission power than an other user equipment if the one user equipment has higher priority than the other user equipment.

8. The method of claim 6, wherein the signal is based on an identity of the second wireless communication apparatus, and wherein using the determined transmission power to discriminate between the second wireless communication apparatus and the one or more third wireless communication apparatus comprises determining (332) the identity of at least the second wireless communication apparatus based on the respective determined transmission powers and on channel estimates in relation to each of the user equipments.

9. The method of claim 1, wherein the first and second wireless communication apparatus is one and the same wireless communication apparatus comprised in a user equipment of a plurality of user equipments associated with a network node of the communication system, and wherein the one or more third wireless communication apparatuses are each comprised in respective user equipments of the plurality of user equipments, and
wherein participating in communication involving the signal transmitted using the determined transmission power comprises transmitting the signal.

10. The method of claim 9 wherein the transmission power is determined based on a status of a transmission buffer of the second wireless communication apparatus.

11. The method of claim 9, wherein using the determined transmission power to discriminate between the second wireless communication apparatus and the one or more third wireless communication apparatus comprises resolving a collision between the second wireless communication apparatus and the one or more third wireless communication apparatus by:
receiving a response from the network node, the response being transmitted using precoding based on a channel estimation, the channel estimation being based on the transmitted signal, wherein the channel estimation is a superposition of a channel between each of the wireless communication apparatuses involved in the collision; and
determining whether or not the response is for the first wireless communication apparatus based on a comparison of a power of the response to a threshold.

12. A computer program product comprising a non-transitory computer readable medium, having thereon a computer program comprising program instructions, the computer program being loadable into a data-processing unit and adapted to cause execution of the method according to claim 1 when the computer program is run by the data-processing unit.

13. A first wireless communication apparatus of a communication system operating in a hardened channel environment, the first wireless communication apparatus comprising a controller adapted to cause:
determination of a transmission power to be used by a second wireless communication apparatus of the communication system for transmission of a signal carrying control information by determining respective transmission powers to be used by each of the user equipments in the plurality of user equipments;
participation in communication involving the signal transmitted using the determined transmission power upon receiving the signal; and
use of the determined transmission power to discriminate between the second wireless communication apparatus and one or more third wireless communication apparatus,
wherein the first wireless communication apparatus uses the determined transmission power to discriminate between the second wireless communication apparatus and the one or more third wireless communication apparatus comprises resolving a collision between the second wireless communication apparatus and the one or more third wireless communication apparatus by:
performing a channel estimation based on the received signal, wherein the channel estimation is a superposition of a channel between each of the wireless communication apparatuses involved in the collision; and
transmitting a response using precoding that is based on the channel estimation.

14. The apparatus of claim 13 wherein the controller is adapted to cause determination of the transmission power as varying over time according to a transmission power pattern.

15. The apparatus of claim 13, wherein the first wireless communication apparatus is comprised in a network node and the second and one or more third wireless communication apparatuses are comprised in respective user equipments of a plurality of user equipments associated with the network node,
wherein participation in communication involving the signal transmitted using the determined transmission power comprises reception of the signal, and
wherein the controller is adapted to cause the determination of the transmission power to be used by the second wireless communication apparatus by causing determination of respective transmission powers to be used by each of the user equipments in the plurality of user equipments.

16. The apparatus of claim 15 wherein the controller is adapted to cause determination of respective transmission powers to be used by each of the user equipments in the plurality of user equipments by causing assignment of the respective transmission powers in accordance with a priority among the user equipments, such that one user equipment is assigned a higher transmission power than an other user equipment if the one user equipment has higher priority than the other user equipment.

17. The apparatus of claim 15, wherein the signal is based on an identity of the second wireless communication apparatus, and wherein the controller is adapted to cause use of the determined transmission power to discriminate between the second wireless communication apparatus and the one or more third wireless communication apparatus by causing determination of the identity of at least the second wireless communication apparatus based on the respective determined transmission powers and on channel estimates in relation to each of the user equipments.

18. The apparatus of claim 13, wherein the first and second wireless communication apparatus is one and the same wireless communication apparatus comprised in a user equipment of a plurality of user equipments associated with a network node of the communication system, and wherein the one or more third wireless communication apparatuses are each comprised in respective user equipments of the plurality of user equipments, and
wherein participation in communication involving the signal transmitted using the determined transmission power comprises transmission of the signal.

19. A first wireless communication apparatus of a communication system operating in a hardened channel environment, the first wireless communication apparatus comprising:
a processor; and
memory comprising instructions executable by the processor whereby the first wireless communication apparatus is operative to:
determine a transmission power to be used by a second wireless communication apparatus of the communication system for transmission of a signal carrying control information by determining respective transmission powers to be used by each of the user equipments in the plurality of user equipments;
participate in communication involving the signal transmitted using the determined transmission power upon receiving the signal; and
use the determined transmission power to discriminate between the second wireless communication apparatus and one or more third wireless communication apparatus,
wherein discriminating between the second wireless communication apparatus and the one or more third wireless communication apparatus comprises resolving a collision between the second wireless communication apparatus and the one or more third wireless communication apparatus by:
performing a channel estimation based on the received signal, wherein the channel estimation is a superposition of a channel between each of the wireless communication apparatuses involved in the collision; and transmitting a response using precoding that is based on the channel estimation.

\* \* \* \* \*